UNITED STATES PATENT OFFICE.

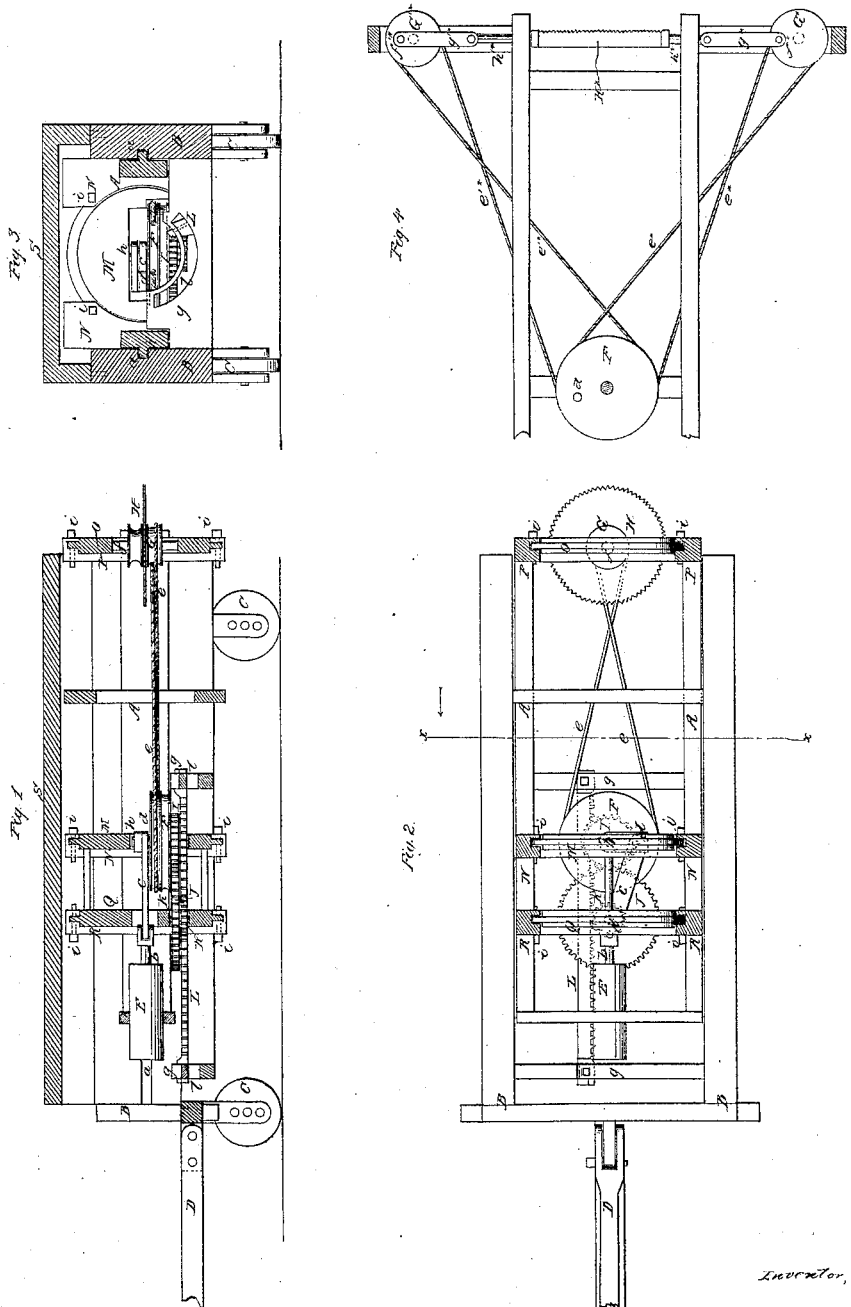

L. S. ALDER, OF CLEONA, INDIANA.

IMPROVEMENT IN MACHINES FOR SAWING DOWN TREES.

Specification forming part of Letters Patent No. 35,805, dated July 8, 1862.

*To all whom it may concern:*

Be it known that I, L. S. ALDER, of Cleona, in the county of Brown and State of Indiana, have invented a new and Improved Machine for Sawing Down Trees, &c.; and I do hereby declare that the following is a full, clear, and exact description of the same, reference being had to the accompanying drawings, forming a part of this specification, in which—

Figure 1 represents a longitudinal vertical section of my invention when used with a circular saw. Fig. 2 is a plan or top view of the same partly in section. Fig. 3 is a transverse vertical section of the same, taken in the plane indicated by the line $x\ x$, Fig. 2, and looking in the direction of the arrow marked opposite to that line. Fig. 4 is a modification showing the changes required when my machine is to be used with a reciprocating saw.

Similar letters of reference in the several figures denote corresponding parts.

The object of this invention is to produce a machine for sawing down trees, &c., which can easily be transported from place to place, and which can be readily adjusted to suit different occasions.

The invention consists in the arrangement of a longitudinally-sliding frame provided with a steam-cylinder, a feed-motion, and the necessary pulleys to give motion to the saw, in combination with a truck running on wheels in such a manner that said frame can be readily brought to the desired locality and position, and that by the action of the steam-cylinder the saw receives the desired motion. It consists, further, in combining with said longitudinally-sliding frame a series of rotary adjustable disks in such a manner that the saw, together with the driving-pulleys and feed-motion, can be set to any desired angle.

To enable those skilled in the art to make and use my invention, I will proceed to describe it with reference to the drawings.

The frame A, which supports the principal working parts of my sawing-machine, slides in grooves $a$ in the sides of a truck, B, which rests on wheels C, and which is drawn from place to place by a draft-pole, D.

The front end of the frame A is occupied by the steam-cylinder E, the piston-rod $b$ of which connects by a rod, $c$, with an eccentric wrist-pin, $d$, projecting from the side of the driving-pulley F. From this pulley a belt, $f\ e$, extends to a pulley, G, on the saw-spindle $f$, which carries the circular saw H.

Instead of a circular saw, however, a reciprocating saw, H*, (see Fig. 4,) might be used, and in this case the driving-pulley F is provided with two grooves, and two belts, $e^*\ e'^*$, extend to pulleys G* G'* on opposite ends of the saw H*. Each of said pulleys is provided with an eccentric wrist-pin, $f^*\ f'^*$, which connect by pitmen $g^*\ g'^*$ with the guide-rods $h^*\ h'^*$, projecting from the ends of the saw H*. By these means the rotary motion of the pulley F is converted into a reciprocating motion of the saw, and by connecting the frame containing the saw H* with the longitudinally-sliding frame A the reciprocating saw can be used in place of the circular saw H. In order to produce the required feed motion of the saw, a cog-wheel, I, is attached to the lower side of pulley F, and this cog-wheel gears into another large wheel, J, to the under side of which a pinion, K, is secured that gears into a stationary toothed rack, L. Said rack is fastened in slotted cross-bars $g$ on the truck-frame, and the several gear-wheels are so arranged in relation to each other that one revolution of the pulley F causes the frame A to move in a longitudinal direction not more than necessary to produce the desired feed of the saw. It is obvious, however, that instead of gear-wheels and toothed racks other devices might be employed to produce the feed motion, and particularly when a reciprocating saw is to be used it might be found desirable to use an intermittent feed motion. It will, however, be easily understood by any skillful mechanic how such a change could be effected; and I do not confine myself, therefore, to the precise means herein described for effecting this purpose.

The pulley F runs on an arbor, $h$, which has its bearings in a disk, M, to which a rotary motion can be imparted in grooved semicircular ways N, secured to the frame A. The center of this disk coincides with the central line drawn in a longitudinal direction through the steam-cylinder E, and a similar disk, O, moving in semicircular ways P, forms the bearings for the saw-spindle $f$. Both these disks are retained in the desired position by draw-pins $i$, and by turning the disk O in one direction or in the other the saw is brought in inclined position.

The cog-wheel J and pinion K, which, by gearing into the toothed rack L, produce the feed motion, is secured to an arbor, $k$, which has its bearings in a disk, Q, rotating in semi-circular ways R precisely like the disks M and O, and the cross-bars $g$, which retain the toothed rack L, are provided with semicircular slots $l$, described from points on the line drawn through the longitudinal center of the steam-cylinder and through the centers of the several disks. By turning the disks M and Q, and by adjusting the toothed rack L in the semicircular slots $l$, the driving-pulley and the entire feed-motion can be brought in a position to correspond to the inclined position of the saw imparted to it by rotating the disk O, as above described. During these changes the steam-cylinder remains stationary, but the piston will have to follow the rotary motions of the disks M, O, and Q, as will be readily understood by referring to Fig. 1 of the drawings.

The truck-frame B is provided with a platform, S, on which a steam-boiler may be secured, so that the sawing-machine can be operated in any locality. The driving-pulley may, however, receive its motion from any other desirable source of power.

Having thus fully described my invention, what I claim as new, and desire to secure by Letters Patent, is—

1. The arrangement of the longitudinally-sliding frame A, containing the driving-pulley F, feed-motion I J K L, or their equivalent, and a saw, H or H*, in combination with the truck-frame B, constructed and operating substantially as and for the purpose set forth.

2. The arrangement of the rotary disks M O Q, in combination with the driving-pulley F, feed-motion I J K L, and saw H, constructed and operating substantially as and for the purpose described.

L. S. ALDER.

Witnesses:
JAMES W. MCILVAIN,
HANIBAL I. MEAD.